United States Patent
Wright et al.

(10) Patent No.: US 6,198,927 B1
(45) Date of Patent: *Mar. 6, 2001

(54) CELLULAR COMMUNICATIONS SYSTEMS AND METHODS USING MOBILITY-CHARACTERIZED REGISTRATION DISTRICTS

(75) Inventors: Andrew S. Wright; Randy G. Chapman, both of Vancouver (CA)

(73) Assignee: Telefonaktiebolaget L M Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/833,335

(22) Filed: Apr. 4, 1997

(51) Int. Cl.$^7$ ....................................................... H04Q 7/20
(52) U.S. Cl. ..................... 455/435; 455/441; 455/444; 455/456
(58) Field of Search ..................... 455/441, 443, 455/444, 435, 432, 426, 433, 434, 458, 486, 422, 446

(56) References Cited

U.S. PATENT DOCUMENTS

| | | |
|---|---|---|
| 4,775,999 | 10/1988 | Williams . |
| 5,353,332 | * 10/1994 | Raith et al. ........................... 455/444 |
| 5,396,645 | 3/1995 | Huff . |
| 5,574,971 | * 11/1996 | Aihara ................................. 455/441 |

FOREIGN PATENT DOCUMENTS

| | | |
|---|---|---|
| 0 562 743 A1 | 3/1993 | (EP) . |
| 0 589 279 A3 | 9/1993 | (EP) . |
| 2 301 733 | 12/1996 | (GB) . |
| 2 303 024 | 2/1997 | (GB) . |
| 03196722 | 9/1991 | (JP) . |
| WO 95/11577 | 4/1995 | (WO) . |
| WO 95/28813 | 10/1995 | (WO) . |

OTHER PUBLICATIONS

International Search Report, PCT/IB98/00770, Oct. 28, 1998.

* cited by examiner

*Primary Examiner*—Doris H. To
*Assistant Examiner*—Lester G. Kincaid
(74) *Attorney, Agent, or Firm*—Myers Bigel Sibley & Sajovec

(57) ABSTRACT

Subscriber units are tracked in a cellular communications system including a plurality of cells which communicate with subscriber units. A cell type is assigned to each cell according to a mobility characteristic of a subscriber unit population of the cell. Each cell is associated with at least one of a plurality of districts based on the cell type of the cell, such that each of the plurality of districts may be characterized according to a mobility characteristic of a subscriber unit population of the district. A subscriber unit is registered with one of the plurality of districts according to the mobility of the subscriber unit. According to preferred method aspects of the invention, at least one district is defined for each cell, each district having a geographical extent with respect to the cell location of the cell, to thereby associate each cell with at least one district. A respective cell identification message is broadcast in a respective one of said plurality of cells, the cell identification message for a cell identifying the cell location of the cell, the geographical extent of the least one district to which the cell is assigned and a cell type representing a mobility characteristic of a subscriber unit population of the cell. A cell identification message is received at a subscriber unit, and the subscriber unit is registered with one of the districts according to the cell type, the cell location and the district geographical extent identified in the received cell identification message.

35 Claims, 12 Drawing Sheets

US 6,198,927 B1

CELLULAR COMMUNICATIONS SYSTEMS AND METHODS USING MOBILITY-CHARACTERIZED REGISTRATION DISTRICTS

FIELD OF THE INVENTION

The present invention relates to communications systems and methods, in particular, to systems and methods for controlling cellular communications systems.

BACKGROUND OF THE INVENTION

Cellular communications systems are commonly employed to provide voice and/or data communications to a plurality of subscribers within an array of defined geographical regions referred to as cells. Examples of voice applications include analog cellular radiotelephone systems such as AMPS, ETACS, NMT-450, and NMT-900, as well as digital cellular radiotelephone systems such as IS-54B in North America and GSM in Europe. These systems, and others, are described, for example, in the book titled *Cellular Radio Systems* by Balston, et al., published by Artech House, Norwood, Mass., 1993. Other types of cellular systems include data communications systems such as CDPD, a digital data transmission system designed to communicate data packets over an AMPS cellular infrastructure, and personal Air Communications Technology (pACT), a two-way paging and messaging protocol and system specification for narrow-band personal communications systems (PCS), a packet data system based on the widely used Internet Protocol (IP).

FIG. 1 illustrates a typical terrestrial cellular radiotelephone communication system 20 as in the prior art. The cellular radiotelephone system may include one or more subscriber units 21, communicating with a plurality of cells 36 served by base stations 23 and a switching office, here shown as a Mobile Telephone Switching Office (MTSO) 25. Although only three cells 36 are shown in FIG. 1, a typical cellular network may include hundreds of cells, may include several switching offices, and may serve thousands, if not millions, of subscriber units. The cells 36 generally serve as nodes in the communication system 20, from which links are established between radiotelephones 21 and the MTSO 25, by way of the base stations 23 serving the cells 36. Thus, for example, a duplex communication link 32 may be effected between two subscriber units 21 or between a subscriber unit 21 and an end user connected to the cellular network 20, for example, an end user 33 utilizing a conventional landline telephone connection through a public telephone switched network 30. The base station 23 functions to relay communications between the cell and the mobile station 21. Those skilled in the art will appreciate that similar cellular structures may be implemented using satellites or similar devices serving similar functions to the terrestrial base stations 23 illustrated in FIG. 1.

FIG. 2 illustrates a typical cellular packet data communications system, specifically, an architecture typically employed in CDPD and pACT networks. An important element of the network is the pACT Data Intermediate System (PDIS) 210, a specialized router that allows a subscriber unit 220 to move among cells 240 without losing connectivity within a fixed infrastructure network such as, for example, an internet. In particular, the PDIS 210 typically provides mobility management by constructing and continuously updating a directory/routing table that maps subscriber unit IP addresses to a temporary address and channel stream that identifies which base station 230 the subscriber unit 220 is currently connected. Typically, communication between a PDIS and a subscriber unit is transparent to a Fixed End Subscriber (FES) 250 communicating with the subscriber unit 220. The FES 250 will issue an IP packet that is routed via an internet router 260 to the subscriber unit's home PDIS. The home PDIS may either route this packet to the subscriber unit via a specific base station 230 associated with the home PDIS or pass the packet to a different PDIS if the subscriber unit 220 has moved into a new radio coverage area served by the second PDIS, with the new PDIS taking on responsibility for routing the packet to the correct base station 230.

One way in which the PDIS can track the location of a subscriber unit is to require the subscriber unit to announce its transfers between base stations by sending a location update message on the reverse or uplink, i.e., subscriber unit to base station, channel after a cell transfer has been performed. In systems with limited reverse channel bandwidth, however, a significant portion of the reverse channel may be consumed by the transmission of location updates by subscriber units. This typically results in a congested reverse channel and a decrease in network throughput. Also, mobiles with limited battery capacity sacrifice significant battery power to transmit their location updates as they traverse each cell boundary.

SUMMARY OF THE INVENTION

In light of the foregoing, it is an object of the present invention to provide communications systems and methods using mobility management techniques which more efficiently utilize system bandwidth than conventional mobility management techniques.

It is another object of the invention to provide cellular communications systems and methods using mobility management techniques which more efficiently utilize power resources of subscriber units than conventional mobility management techniques.

These and other objects, features and advantages are provided according to the present invention by cellular communications systems and methods in which cells of the communications system are characterized according to cell types based on mobility characteristics of the subscriber unit population within the cells. Districts are defined for the cells, and a cell identification message is broadcast in each cell, identifying the cell location, the cell type and the geographic extent of the one or more districts with which the cell is associated. The cell types preferably include geographic cells and transportation corridor cells. Geographic cells are characterized as having a subscriber unit population having a low aggregate mobility, such as hand-held pedestrian units in an urban area, while transportation corridor cells are characterized as having a subscriber unit population including a subpopulation of subscriber units having a higher aggregate mobility, such as vehicular-based units on a thorofare such as a freeway. A subscriber unit registers with the districts according to the cell type and district identified in a received cell identification message. For example, if a subscriber unit is currently registered with a geographic district but encounters a predetermined number of transportation corridor cells within a predetermined time interval, indicating that the subscriber unit is traveling at a relatively high speed in a transportation corridor, the subscriber unit may register with the transportation corridor district of the highway cells. The geographic districts are preferably mobile-centric, that is, a subscriber unit, upon exiting one geographic district, registers with a new geographic district which includes cells surrounding the cell in the new district with which the subscriber registers.

The present invention stems from the realization that the frequency of location updating by subscriber units may be reduced by taking advantage of the mobility characteristics of subscriber units. For a subscriber unit which tends to linger within a relatively small geographic area, e.g., a handheld unit being operated by a pedestrian in an urban area which has a densely packed cell pattern, the use of a mobile centric geographic district surrounding the subscriber unit can help reduce the number of transitions across district boundaries and thus the number of location updates required to track the subscriber unit in the area. For a subscriber unit which is passing along a transportation corridor, e.g., a vehicle-based unit traveling along a freeway such that it passes relatively quickly through several cells, using a transportation corridor district approximately constrained to the path of the transportation corridor can reduce the number of inter-district transitions and subsequent location updates which are needed to track the subscriber unit. By reducing the number of location update messages transmitted by subscriber units, system bandwidth and subscriber unit power resources can be conserved.

In particular, according to the present invention, subscriber units are tracked in a cellular communications system including a plurality of cells which communicate with subscriber units. A cell type is assigned to each cell according to a mobility characteristic of a subscriber unit population of the cell. Each cell is associated with at least one of a plurality of districts based on the cell type of the cell, such that each of the plurality of districts may be characterized according to a mobility characteristic of a subscriber unit population of the district. A subscriber unit is registered with one of the plurality of the districts according to the mobility of the subscriber unit. Preferably, a first cell type is assigned to cells characterized by a typical subscriber unit population dominated by subscriber units of a first aggregate mobility and a second cell type is assigned to cells characterized by a typical subscriber unit population including a subpopulation of subscriber units of a second aggregate mobility higher than the first aggregate mobility. Cells of the first and second types preferably are associated with districts of a first type, while only cells of the second type are preferably associated with districts of a second type. The subscriber unit is registered with a district of the first type when the mobility of the subscriber unit is less than a predetermined threshold. The subscriber unit is registered with a district of the second type when the mobility of the subscriber unit is greater than the predetermined threshold. Preferably, each of the cells of the second type have a coverage area including a portion of a transportation corridor.

According to preferred method aspects of the invention, in a cellular communications system including a plurality of cells, each cell having a cell location, at least one district is defined for each cell, each district having a geographical extent with respect to the cell location of the cell. A respective cell identification message is broadcast in a respective one of the plurality of cells, the cell identification message for a cell identifying the cell location of the cell, the geographical extent of the at least one district to which the cell is assigned and a cell type representing a mobility characteristic of a subscriber unit population of the cell. At least one of the cell identification messages is received at a subscriber unit, and the subscriber unit is registered with one of the districts according to the cell type, the cell location and the district geographical extent identified in the received at least one cell identification message. The plurality of cells may include cells of a first cell type characterized by a typical subscriber unit population dominated by subscriber units of a first aggregate mobility and cells of a second cell type characterized by a typical subscriber unit population including a subpopulation of subscriber units of a second aggregate mobility higher than the first aggregate mobility, and districts of a first district type are preferably defined for cells of the first and second cell types, while districts of a second district type are defined for cells of the second cell type, such that districts of the first type encompass cell locations of at least one of a cell of the first cell type and a cell of the second cell type while districts of the second type encompass cell locations of cells of the second cell type. The subscriber unit is then registered with one of a district of the first district type and a district of the second type according to the cell type identified in the received at least one cell identification message.

According to another aspect of the invention, a first cell identification message identifying a first cell having a cell location and having a first district of the first district type associated therewith may be received, and the subscriber unit registered with the first district in response to receipt of the first cell identification message. At least one cell identification message may then be received while the subscriber unit is registered with the first district. The subscriber registers with a new district of the second district type in response to receipt, within a predetermined time interval, of a predetermined number of cell identification messages identifying cells of the second type having the new district associated therewith. The subscriber unit registers with a new district of the first district type in response to receipt of a cell identification message identifying a cell having a cell location outside of the geographical extent of the first district and having the new district associated therewith. Otherwise, the subscriber unit continues registration with the first district in response to receipt of a cell identification message identifying a cell having a cell location within the geographical extent of the first district.

According to another aspect, a first cell identification message identifying a first cell having a first district of the second district type associated therewith is received, and the subscriber unit is registered with the first district in response to receipt of the first cell identification message. At least one cell identification message is then received while the subscriber unit is registered with the first district. The subscriber registers with a new district of the first district type in response to receipt of a cell identification message identifying a cell of the first cell type having a cell location outside of the geographical extent of the first district. The subscriber unit registers with a new district of the second district type in response to receipt of a cell identification message identifying a cell of the second cell type having a cell location outside of the geographical extent of the first district. The subscriber unit registers with the second district of the first type in response to failing to receive, within a predetermined time interval, a cell identification message identifying a new cell of the second cell type having a cell location within the geographical extent of the first district of the second type. Otherwise, the subscriber unit continues registration with the first district of the second type in response to receipt, within the predetermined time interval, of a cell identification message identifying a new cell of the second type having a cell location within the geographical extent of the first district of the second type.

Preferably, a district of the first district type is defined for cells of the first and second cell types, while districts of second type are defined only for cells of the second cell type.

A district of the first type is preferably defined for a cell such that the district has a geographic extent which encompasses cell locations of cells which surround the cell. Districts of the second district type are preferably defined for cells of the second cell type such that the geographic extent of the district substantially coincides with a transportation corridor. Registration preferably occurs by communicating a location update message from the subscriber unit to a base station serving a cell identified in the received at least one cell identification message, the location update message identifying the subscriber unit and the district type with which the subscriber unit is to be registered, and associating the subscriber unit with a district identified in the at least one cell identification message having the district type identified in the location update message to thereby register the subscriber unit with the district.

A geographic region served by the cellular communications system preferably is defined in terms of a coordinate reference frame, and the cell location of each cell is defined in terms of the coordinate reference frame. The districts preferably are defined in terms of a plurality of offsets from the cell location in terms of the coordinate reference frame. The geographic region may be defined in terms of a coordinate reference frame which deviates from rectangularity according to a predetermined warping.

A subscriber unit according to the present invention includes cell identification message receiving means for receiving at least one of the cell identification messages, and location update message transmitting means, responsive to the cell identification message receiving means, for transmitting a location update message identifying the subscriber unit and a district type with which the subscriber unit is to be identified according to the cell type, the cell location and the district geographical extent identified in the received at least one cell identification message, to thereby register the subscriber unit with the district identified in the location update message. The location update transmitting means preferably includes means for transmitting a location update message identifying one of the first and second district types according to the cell type identified in the received at least one cell identification message.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

Figure 1:
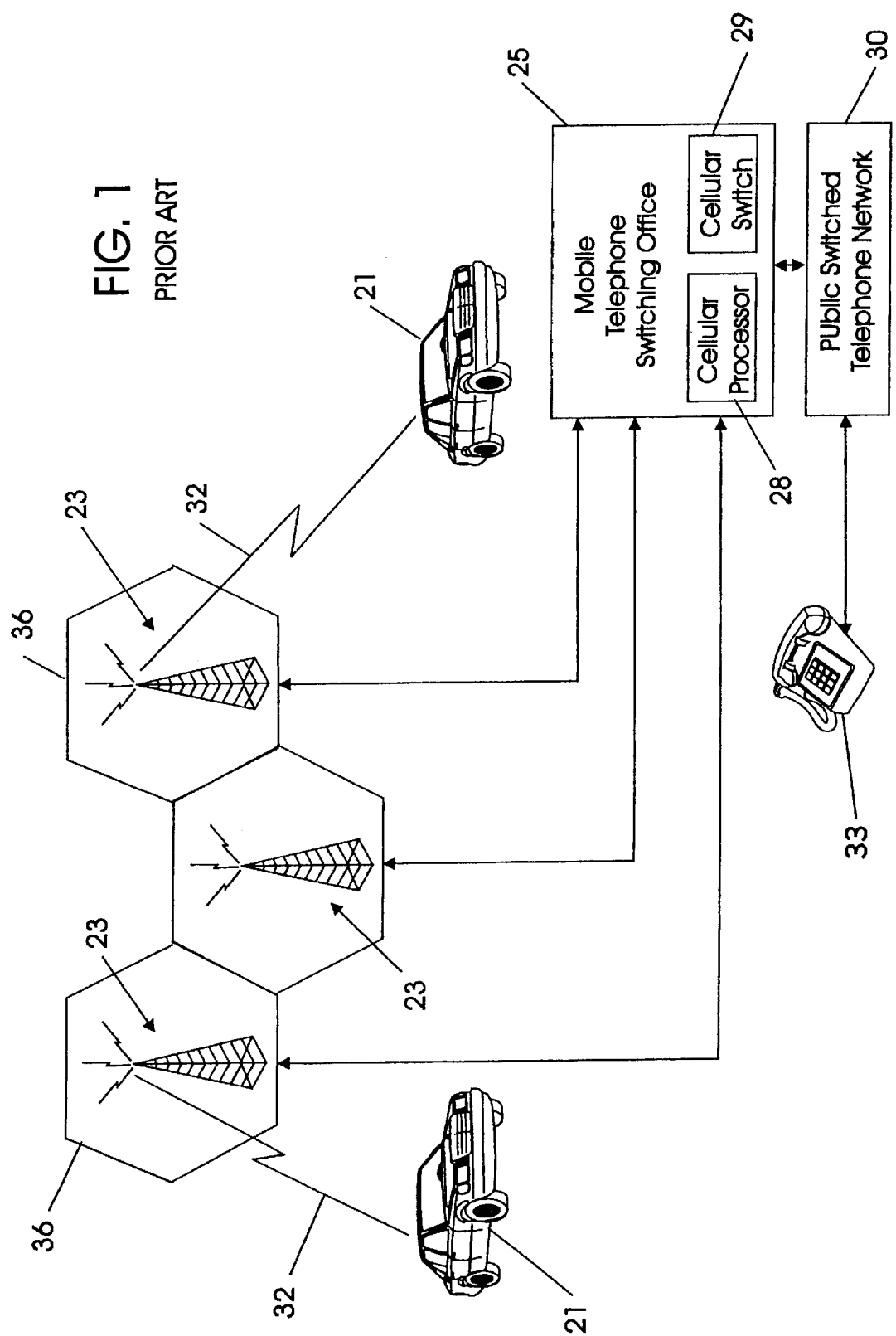
FIG. 1 is a schematic diagram illustrating a cellular radiotelephone system according to the prior art.
Figure 2:
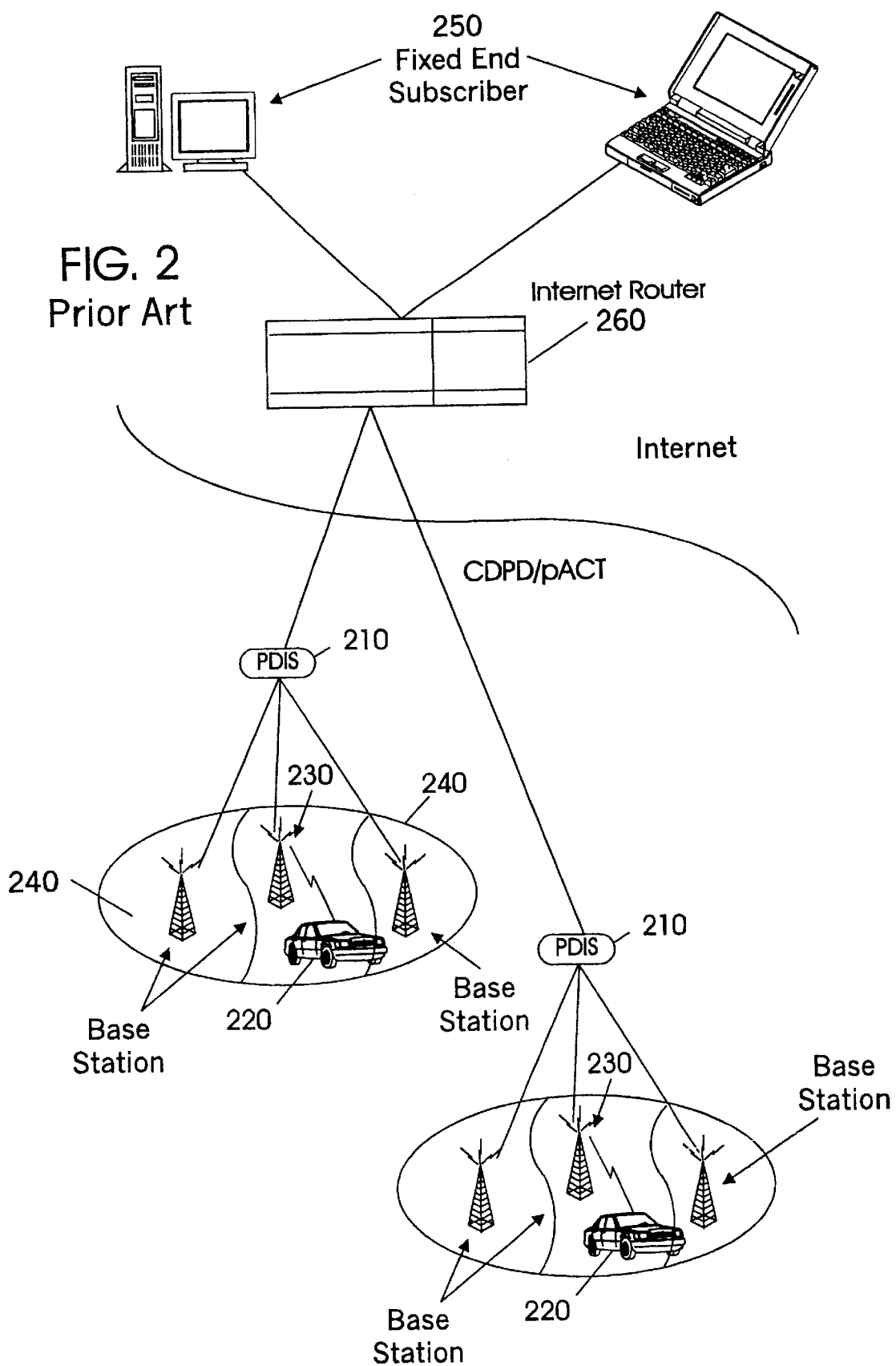
FIG. 2 is a schematic diagram illustrating a CDPD/pACT network according to the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the size and contours of regions are exaggerated for clarity, and like numbers refer to like elements throughout.

Mobility-Characterized Registration Districts

According to the present invention, the concept of mobility-characterized registration districts is introduced to provide intelligent registration of a subscriber unit based on the mobility characteristics of cells in the system and the behavior of the subscriber unit, thus allowing the subscriber unit to migrate across geographic areas including multiple cells with fewer location updates. Cells are assigned a cell type according to a mobility characteristic of a subscriber unit population in the cell, and cells are associated with different types of districts according to this cell type. A subscriber unit may then be registered with a particular district according to its current behavior, i.e., its mobility. For example, if a subscriber unit is traveling relatively rapidly along a highway or other transportation corridor, frequently crossing cell boundaries, it may be registered with a district that conforms to the transportation corridor, e.g., a registration district including only cells which cover the transportation corridor. Because the subscriber unit is likely to remain on the path of the highway, this registration district may be made narrow to cut down on the number of cells which must be searched to find the subscriber unit for paging and other purposes. Because the district is narrow, the registration district may extend along the highway for a considerable distance to increase the time needed between location updates. This allows power and bandwidth conservation to be achieved without requiring an undue increase in complexity of radio resource and mobility management in the system.

Figure 3:
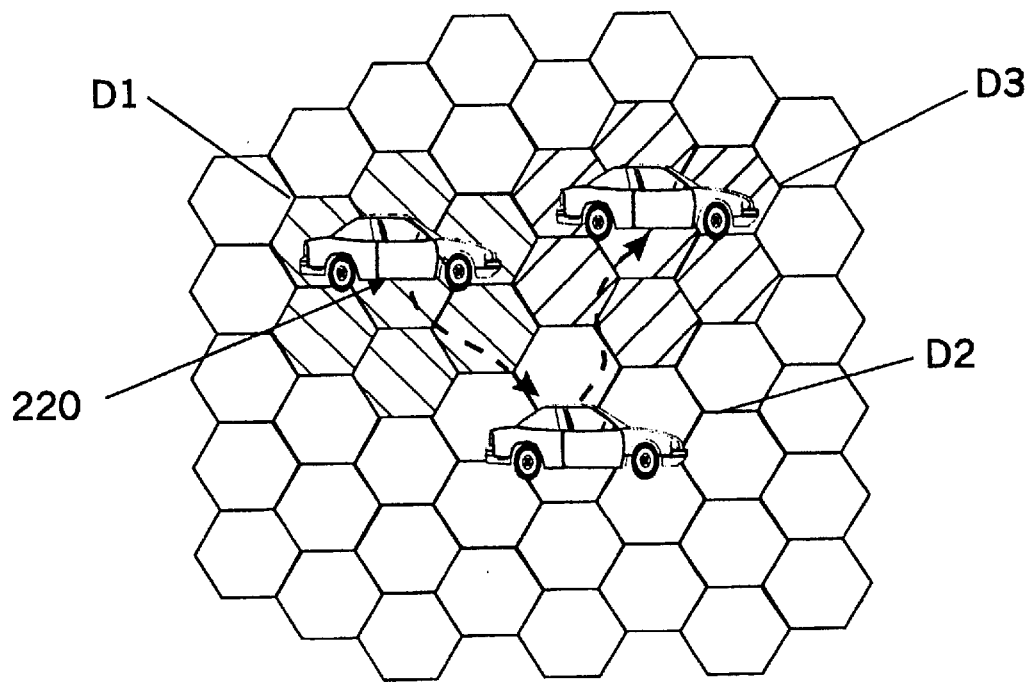
FIG. 3 is a plan view illustrating registration districts according to the present invention.

FIG. 3 illustrates registration districts D1, D2, D3 according to the present invention. According to the present invention, a cell identification message is broadcast in each cell of the system, informing a population of subscriber units of the cell location of the cell and the geographic extent of the district with which the cell is associated. Preferably, a subscriber unit 220 passing into a new cell outside of the geographic extent of a district D1 with which it is currently registered registers with a new district D2 associated with the new cell. Upon exiting the second district D2, the subscriber unit 220 registers with the third district D3. Although the districts shown in FIG. 3 are shown as uniform size and shape, those skilled in the art will appreciate that this is not a requirement according to the present invention. It will be understood that districts according to the present invention can have many sizes, shapes and topological characteristics, including discrete, overlapping, contiguous, and distributed, and may be associated with any number of cells.

Cells preferably are designated as either geographic or transportation corridor cells, which is in turn used to associate the cells with mobility-characterized registration districts. Geographic cells may be characterized as having a typical subscriber unit population having a low aggregate mobility; examples of such cells include cells covering portions of concentrated urban districts with a large number of fixed or pedestrian-carried subscriber units. Transportation corridor cells may be characterized as having a typical subscriber unit population including a subpopulation of subscriber units with a higher aggregate mobility; examples of such cells are cells which cover portions of high-speed thoroughfares, rail corridors, and the like. Those skilled in the art will appreciate that while transportation corridor cells may typically include subscriber units with high mobility, the typical subscriber unit population of a transportation corridor cell may also include a subpopulation of lower mobility subscriber units. For example, a transportation corridor cell may include a freeway within its coverage area, but may also cover high density commercial or residential areas with significant populations of low mobility or static subscriber units.

According to the present invention, a cell is assigned a cell type according to a mobility characteristic of the typical subscriber unit population in the cell. The cell type, i.e., the mobility characteristic of the cells, is then used to define associations of cells with mobility-characterized registration districts. Preferably, two types of districts are defined; geographic districts and transportation corridor districts. According to a preferred aspect of the invention, each transportation corridor cell may be associated with a transportation corridor district and a geographic district, while each geographic cell is preferably associated only with a geographic district.

Figure 4:
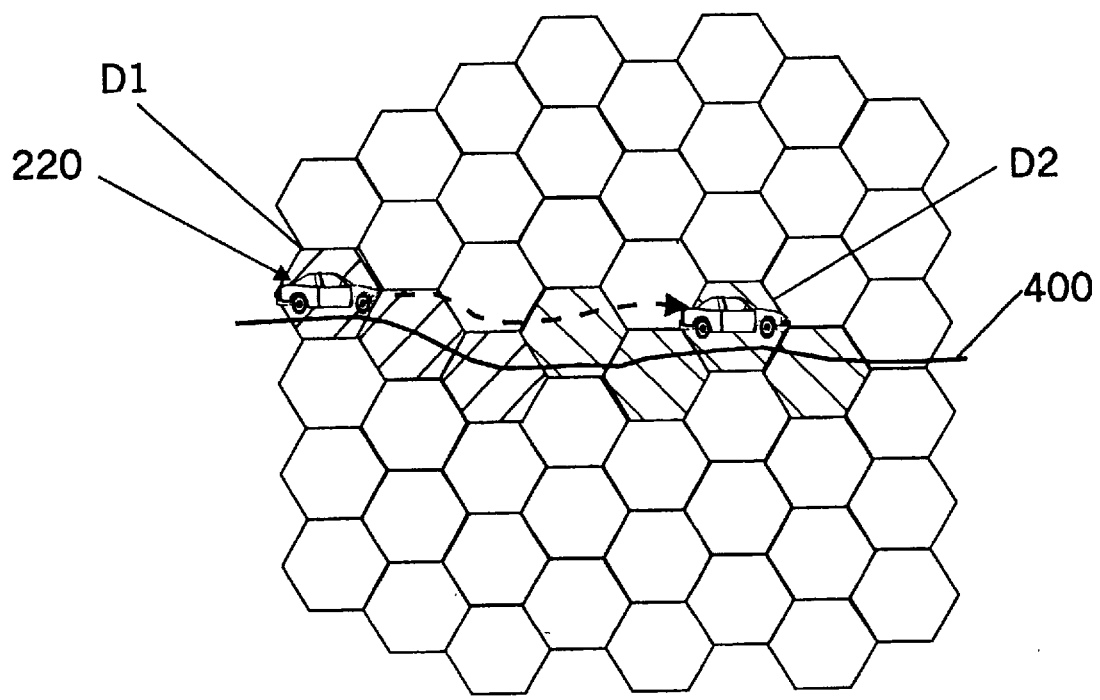
FIG. 4 is a plan view illustrating transportation corridor districts according to the present invention.

FIG. 4 illustrates transportation corridor districts D1, D2 according to the present invention. As a subscriber unit 220 travels along a highway 400, it registers with districts D1, D2 which roughly conform to the path of the highway. The cell identification messages broadcast by cells in the transportation corridor districts D1, D2 include a special cell type attribute identifying them as transportation corridor cells which include a subpopulation of higher mobility subscriber units such as would typically be present on a transportation corridor such as a freeway. The geographical extent information given in the cell identification messages of the cells D1, D2 define the size and shape of the districts associated with the cells D1, D2.

Registration districts as describer above may be used to intelligently track subscriber units for purposes of delivering pages and other messages to the subscriber units. In a pACT system, for example, the mobility management functions of associating subscriber units with particular districts may be performed by maintaining a database of the associations between subscriber units and districts at the pACT Date Intermediate System (PDIS). The PDIS, upon receiving a message for a subscriber unit registered with a district for which it has routing responsibility, can limit the paging search for the subscriber to those channel streams, e.g., base stations, associated with the district with which the subscriber is registered.

Neighborhood Coordinates, Areas, Districts and Cells

Figure 5:
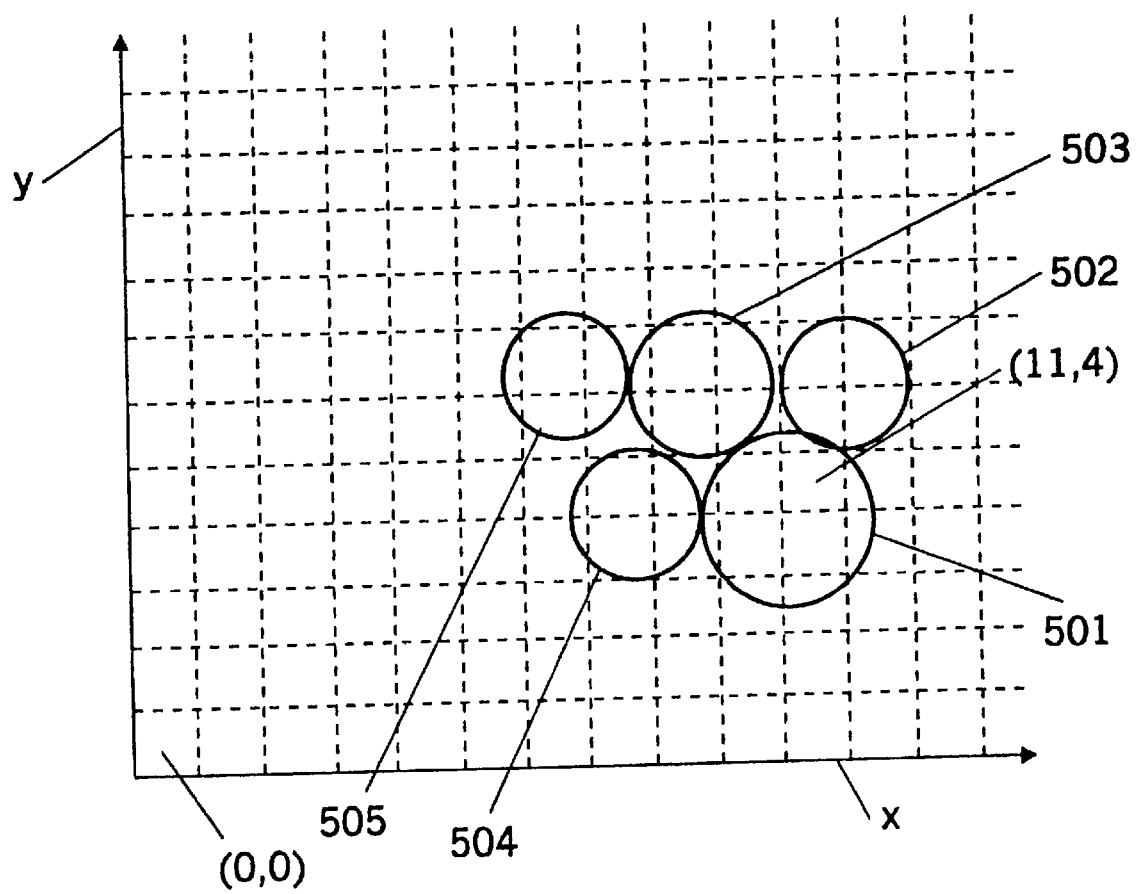
FIG. 5 is plan view illustrating neighborhoods and cells in a cellular communications system according the present invention.

According to the present invention, a geographic region served by a cellular communications system preferably is defined in terms of neighborhood coordinate indices x,y with respect to an origin (0,0) as illustrated in FIG. 5. A cell preferably is associated with only one neighborhood coordinate location. The cell location of the cell is preferably defined by assigning a neighborhood coordinate location to the cell, for example, by identifying neighborhood coordinates for the cell in the cell's identification message. A neighborhood coordinate location can be associated with more than one cell, e.g., cell identification messages broadcasted by two cells can identify the same neighborhood coordinates as the cells' cell locations. The cells associated with a particular neighborhood coordinate location can also be contiguous and/or distributed. For example, as illustrated in FIG. 5, the cell identification message for a first cell 501 could identify coordinates within the cell 501, e.g., (10,4), or even coordinates outside of the coverage area of the cell 501. Any of the cells 502, 503, 504 adjacent to the first cell 501 could broadcast the same coordinates in their cell identification messages, effectively enlarging the cellular coverage area associated with the neighborhood coordinate location of the first cell 1. A nonadjacent cell 505 could also identify the same neighborhood coordinates in its cell identification message. Cells associated with a particular neighborhood coordinate location may be of various types, e.g., highway and/or geographic cells.

Figure 6:
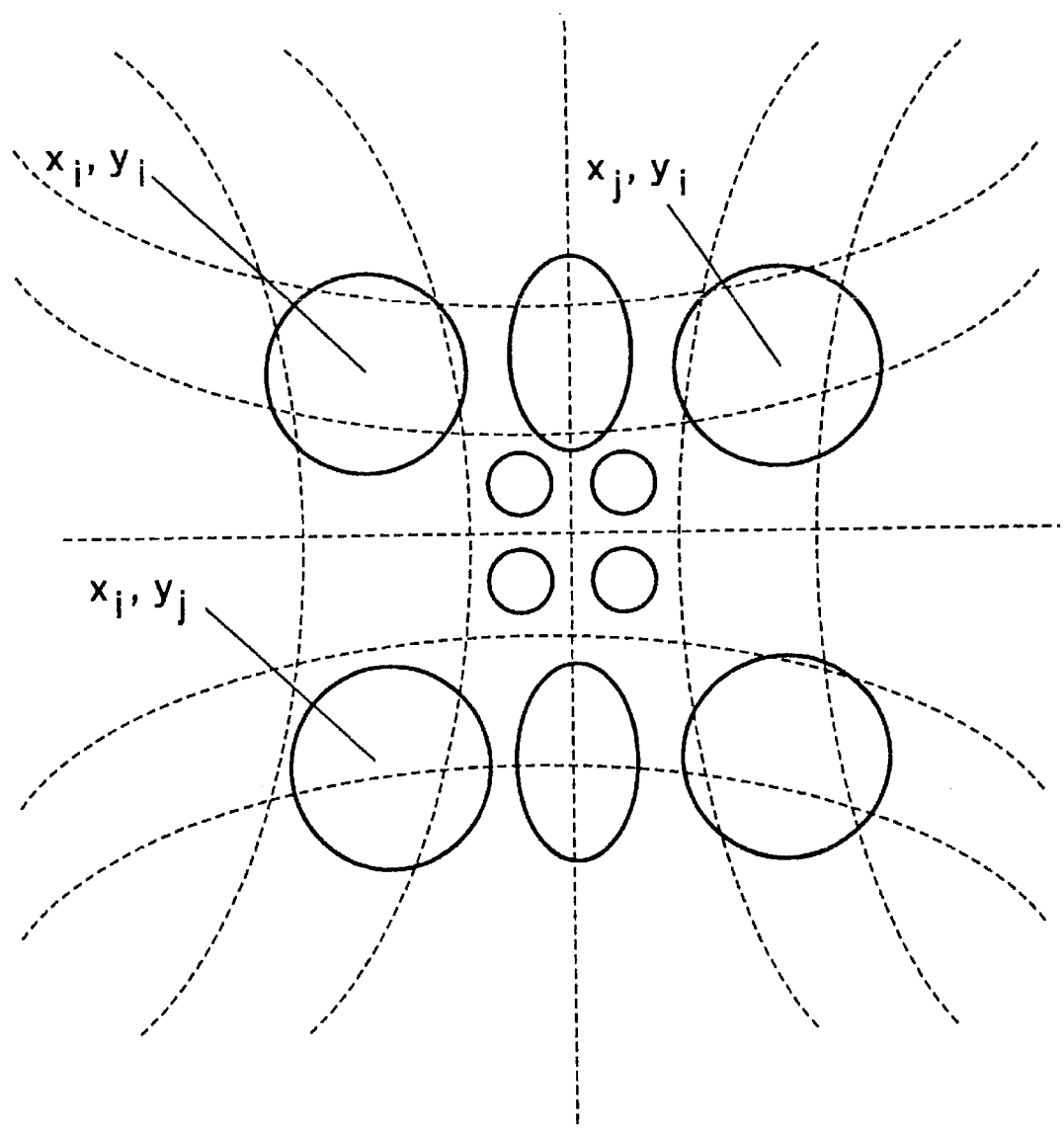
FIG. 6 is a plan view illustrating warped neighborhoods according to the present invention.

To allow further flexibility in mobility management, the interstices between neighborhood coordinate locations may also be defined as a matrix of areas referenced by area coordinate indices, thus creating further subdivision of the neighborhood coordinate grid into a neighborhood/area coordinate system. As illustrated in FIG. 6, the neighborhood/area coordinate system may also be "warped" from a rectangular plan to achieve a nonrectangular layout. The warped neighborhood coordinate system can provide variation in the size and shape of the neighborhood grid which, in conjunction with variable district coordinate offsets as described below, can help provide greater flexibility in the creation of districts of different sizes and shapes. For example, the distortion imposed upon the grid may be utilized to reflect configurations of population concentrations and geographic relief, e.g., Lake Washington in the middle of the Seattle/Kirkland area.

Preferably, a district associated with a cell is defined by defining the geographic extent of the district in terms of the neighborhood coordinate indices. Thus, for example, a geographic cell, i.e., a cell which covers an area likely to carry slow moving traffic, identifies itself as a geographic cell and specifies its location, e.g., its neighborhood (and possibly area) coordinates, in its cell identification message. The cell also identifies the geographical extent of a registration district with which it is associated, preferably with respect to the cell location in the neighborhood/area coordinate system.

As illustrated in Table 1, the cell identification message broadcast in a cell preferably includes parameters which provide a way to identify the type of cell, e.g., geographic or transportation corridor, the cell's location within a neighborhood/area coordinate system and the geographical extent of the at least one district associated with the cell within the neighborhood/area coordinate system. The cell identification message preferably includes a field cell type identifying the cell type of the cell, e.g., geographic or transportation corridor, and cell locations coordinates $n_x$, $n_y$ identifying the neighborhood and area coordinates $a_x$, $a_y$ of the cell within the neighborhood. As illustrated in Table 1, the geographical extent of the districts associated with the cell are preferably given as positive and negative offsets from the cell location.

TABLE 1

Exemplary Cell Identification Message Format

| Cell Type | Area x coordinate (ax) | Area y coordinate (ay) |
|---|---|---|
| Positive geographic district x offset (pgx) | Negative geographic district x offset (ngx) | |
| Positive geographic district y offset (pgy) | Negative geographic district y offset (ngy) | |
| Positive transportation corridor district x offset (phx) | Negative transportation corridor district x offset (nhx) | |
| Positive transportation corridor district y offset (phy) | Negative transportation corridor district y offset (phy) | |
| Neighborhood x coordinate (nx) | | |
| Neighborhood y coordinate (ny) | | |

For the fields illustrated in Table 1, the geographic district for a cell may be defined as the area encompassed by the cell location x,y plus and minus the geographical offsets pgx, ngx, pgy, ngy:

Geographic District=x−ngx<x<x+pgx, y−ngy<y<y+pgy.

A transportation corridor, e.g., a cell which covers a transportation corridor likely to carry a significant number of subscriber units traveling at relatively high speeds, identifies itself as a transportation corridor cell and specifies its location, e.g., its neighborhood, in its cell identification message. Similarly to a geographic cell, a highway cell may be characterized in terms of the cell location x,y and the highway offsets phx, nhx, phy, nhy:

Transportation corridor district=x−nhx<x<x+phx, y−nhy<y<y+phy.

As illustrated in Table 1, multiple district parameters may be included in the cell identification message such that a cell may be associated with multiple districts. Preferably, geographic districts may include both geographic and highway cells, while transportation corridor districts preferably are constrained to include only highway cells. Those skilled in the art will appreciate, however, that other district types and/or cell types may be defined according to the present invention, with different characteristics and inclusion rules than those discussed in detail herein. For example, different classes of transportation corridor districts may be defined based on different mobilities of typical subscriber unit populations within the corridor, e.g., superhighway, commuter rail, and the like. Similarly, different types of geographic districts may be defined. Other district and cell types based on various mobility characteristics of the subscriber population may also be used with the present invention. Districts may also be dynamically reconfigured, for example, by varying the cell location, district offset and other parameters included in the cell identification message. For example, in the illustrated pACT embodiment, the PDIS and the subscriber unit may reconfigure districts after the subscriber unit exits a district.

Geographic districts are preferably defined in a mobile centric fashion. When a subscriber unit moves out of a geographic district and a new geographic district is calculated, the old and new geographic districts preferably overlap. Preferably, as a subscriber unit exits a first geographic district, it will register with a new geographic district including cells which surround the cell with which the subscriber unit registers, as illustrated by the overlap of the districts D1, D2, D3 in FIG. 3. This can reduce the likelihood of repeated re-registration by a subscriber unit operating near the border of two adjacent cells, and thus can aid system stability and prevent unnecessary waste of system spectral resources on location update messages.

Transportation corridor districts may be viewed as large geographic districts consisting of only highway cells, that is, only cells which transmit a cell identification message identifying themselves as transportation corridor cells. Those skilled in the art will understand that although transportation districts preferably are larger than geographic districts because of the higher mobility of the traffic therein, transportation districts of various sizes and shapes may be defined according to the present invention.

To register with a district, a subscriber unit preferably transmits a location update message such as the one illustrated in Table 2. Specifically, the location update message identifies the subscriber unit and indicates the type of district with which the subscriber unit is to be registered. For the illustrated embodiment, this is indicated by a bit D in the message format, thus allowing for a choice of two types of districts, e.g., geographic and transportation corridor. Those skilled in the art will appreciate that the types of districts which may be utilized with the present invention could be expanded beyond two, and the field used to identify the desired district type could accordingly be expanded to include additional bits. Other techniques for identifying a desired district type could also be employed.

TABLE 2

Exemplary Location Update Message Format

| Identification and Control Data | D |
|---|---|

Figure 7:
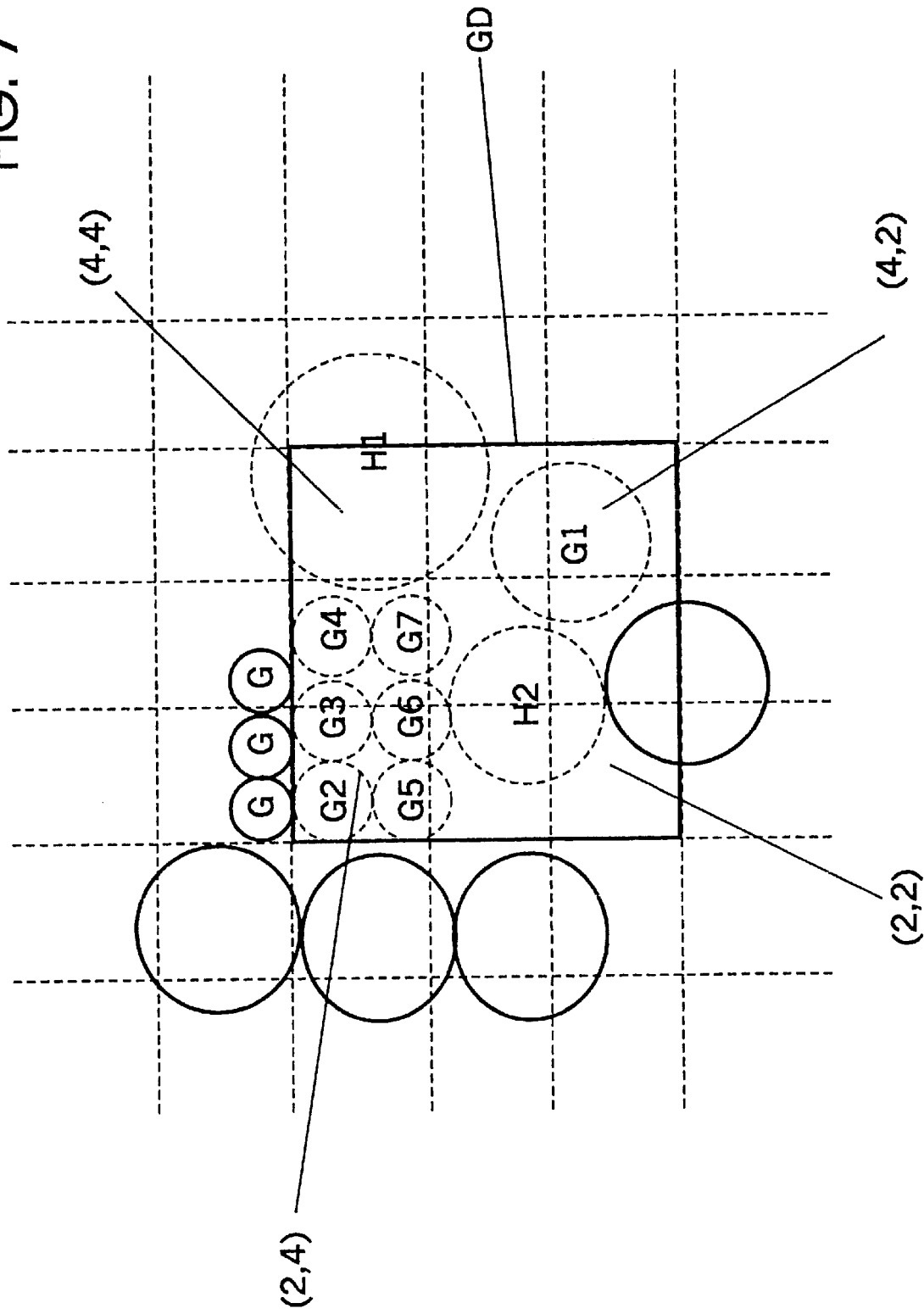
FIG. 7 is a plan view illustrating a geographic district according to the present invention.

A geographic district may be considered to include a set of neighborhoods where each neighborhood contains one or more geographic or highway cells. A transportation corridor district maybe considered to include a set of neighborhoods where each neighborhood contains one or more highway cells. For example, as illustrated in FIG. 7, where it is assumed that the cell identification messages include cell locations which correspond closely with actual geographic locations of the cells. If subscriber unit registers in a cell having a cell location in neighborhood coordinates of (3,4) shown in FIG. 7, the cell being associated with a geographic district GD having offsets of ngx=1, pgx=1, ngy=2 and pgy=0, the geographic district GD would include seven geographic cells G1–G7 and two transportation corridor cells H1, H2, i.e., those cells having cell locations within the rectangle bounded by the neighborhood coordinates (2,2), (2,4), (4, 2) and (4,4).

Figure 8:
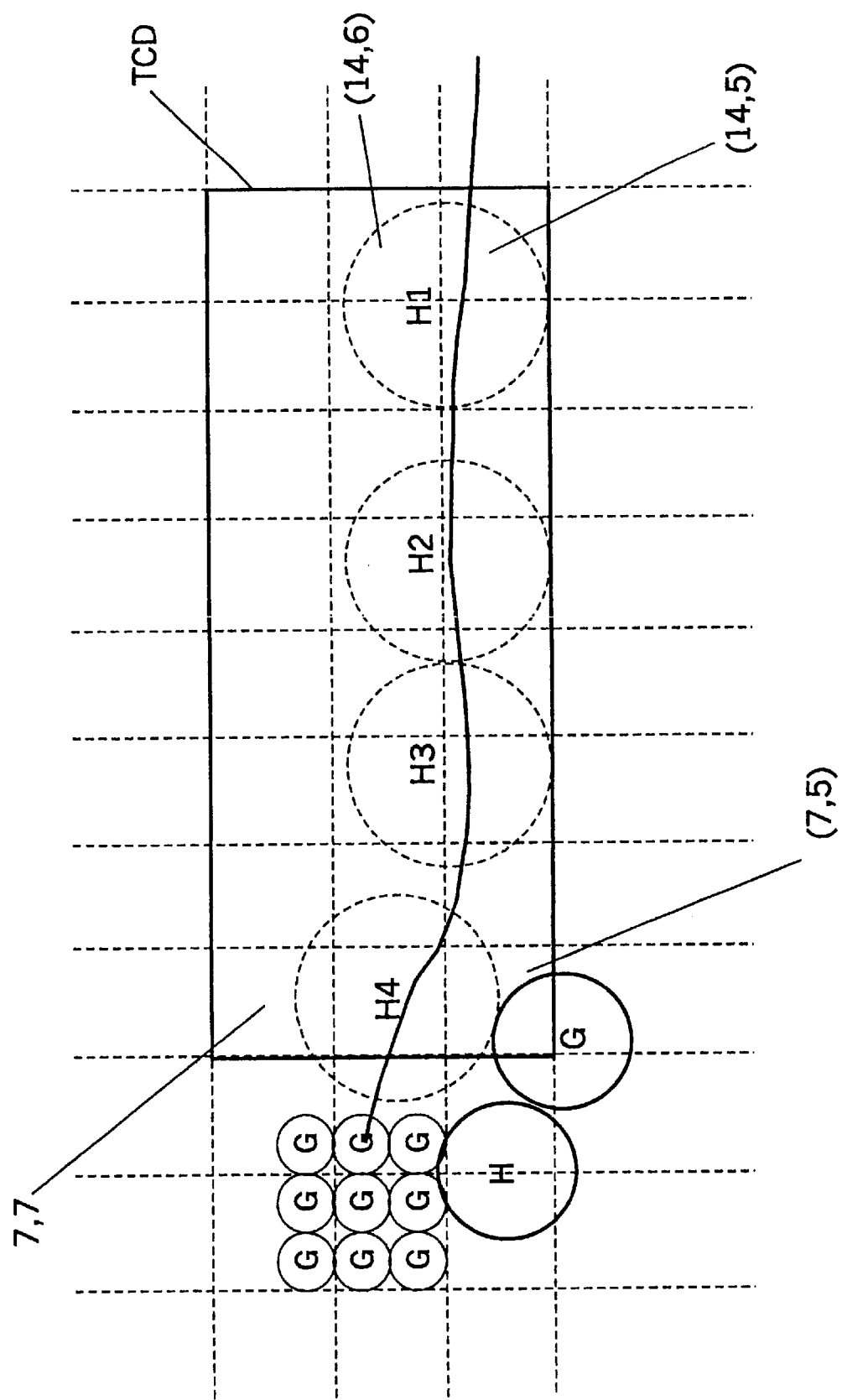
FIG. 8 is a plan view illustrating a transportation corridor district according to the present invention.

An example of a transportation corridor district TCD is illustrated in FIG. 8. If a subscriber registers in the transportation corridor cell H1 located at a cell location (14,6) which is associated with a transportation corridor district TCD with offsets nhx=7, phx=0, nhy=1 and phy=1, the transportation corridor district TCD would include the transportation corridor cells H1–H4, which have cell locations falling within the rectangle bounded by the neighborhood coordinates (7,7), (7,5), (14, 5) and (14,7).

District Registration

Figure 9:
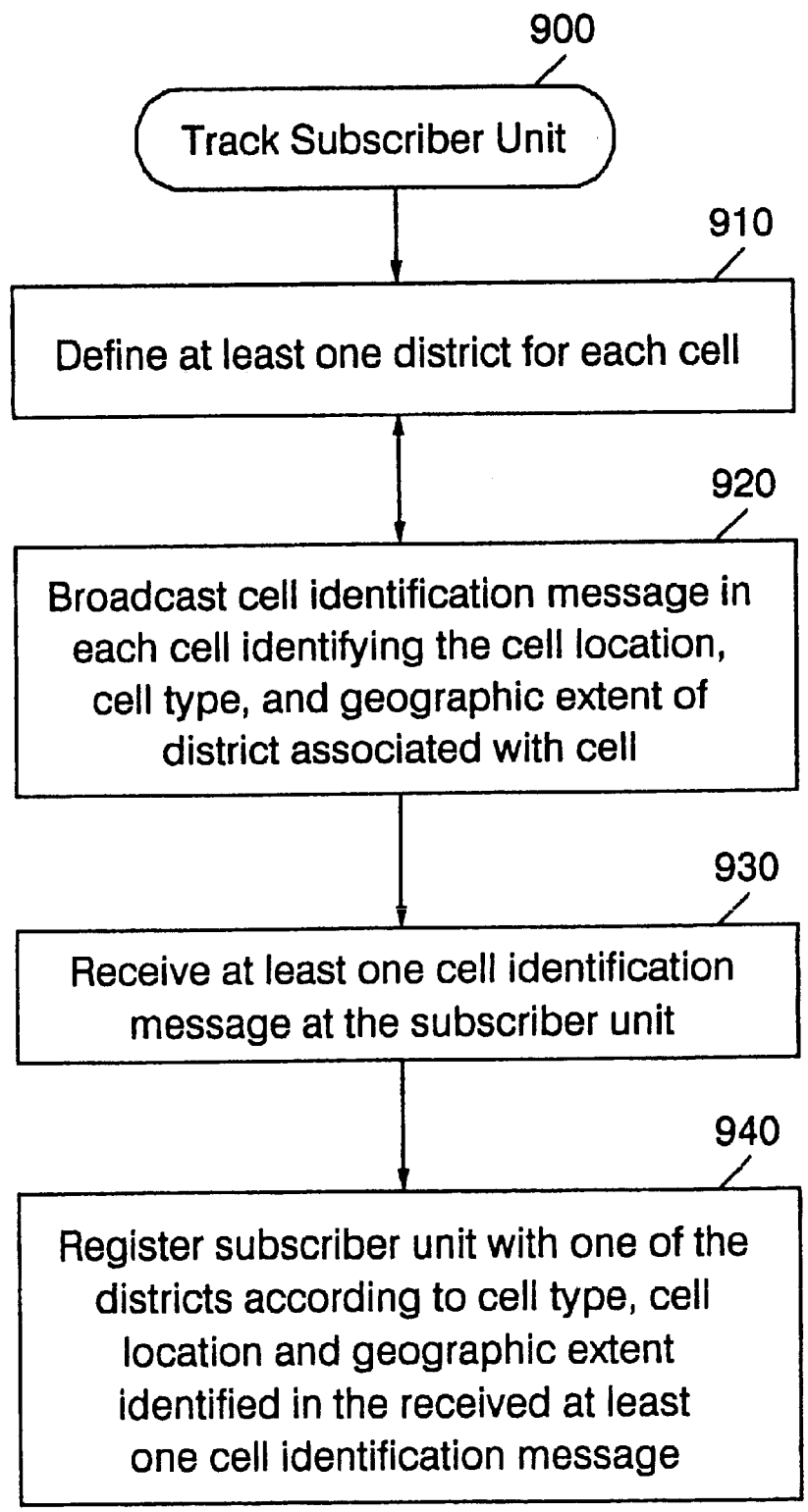
FIGS. 9–11 are flowchart illustrations of operations for tracking a subscriber unit in a cellular communications system according to the present invention.
Figure 10:
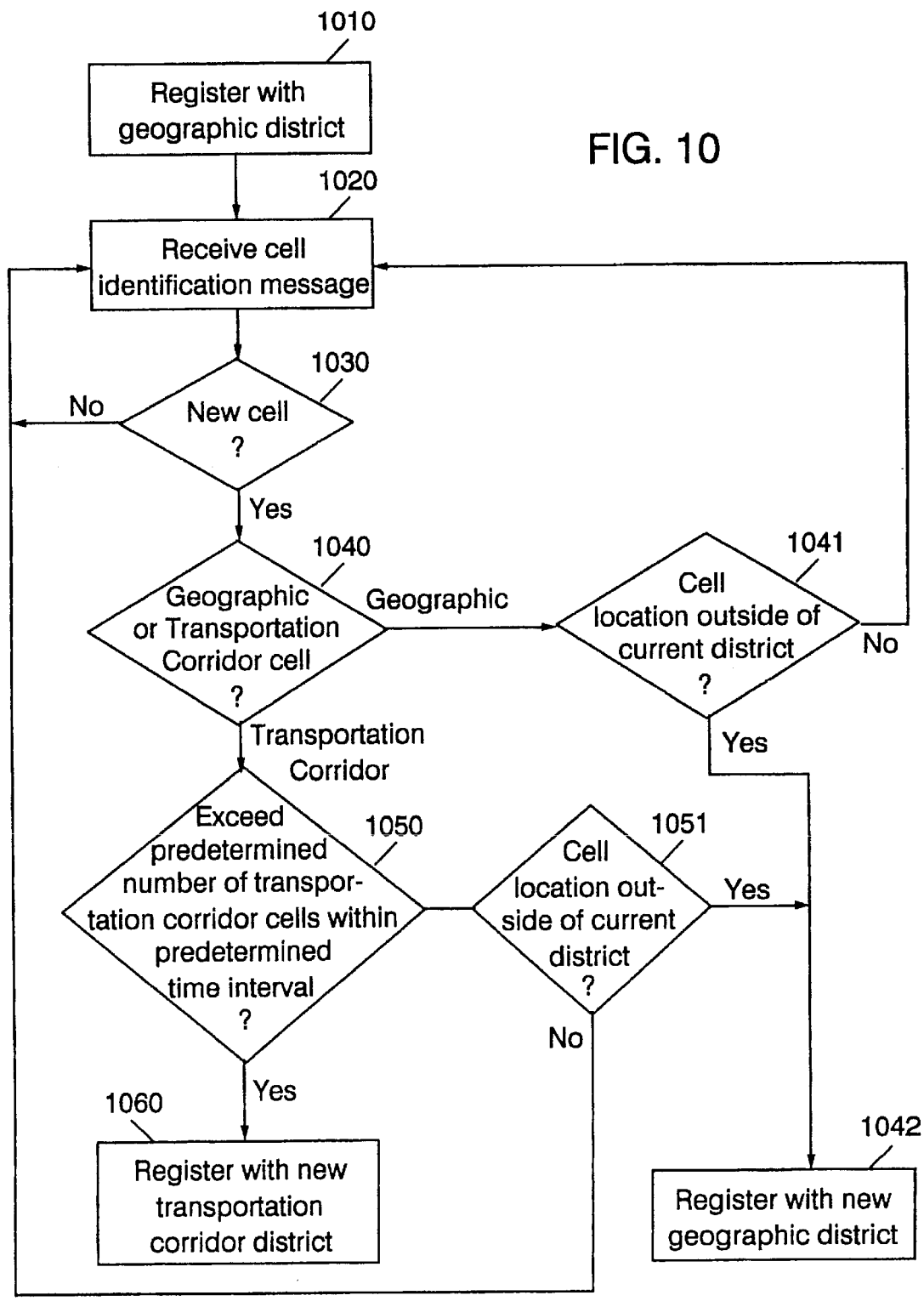
Figure 11:
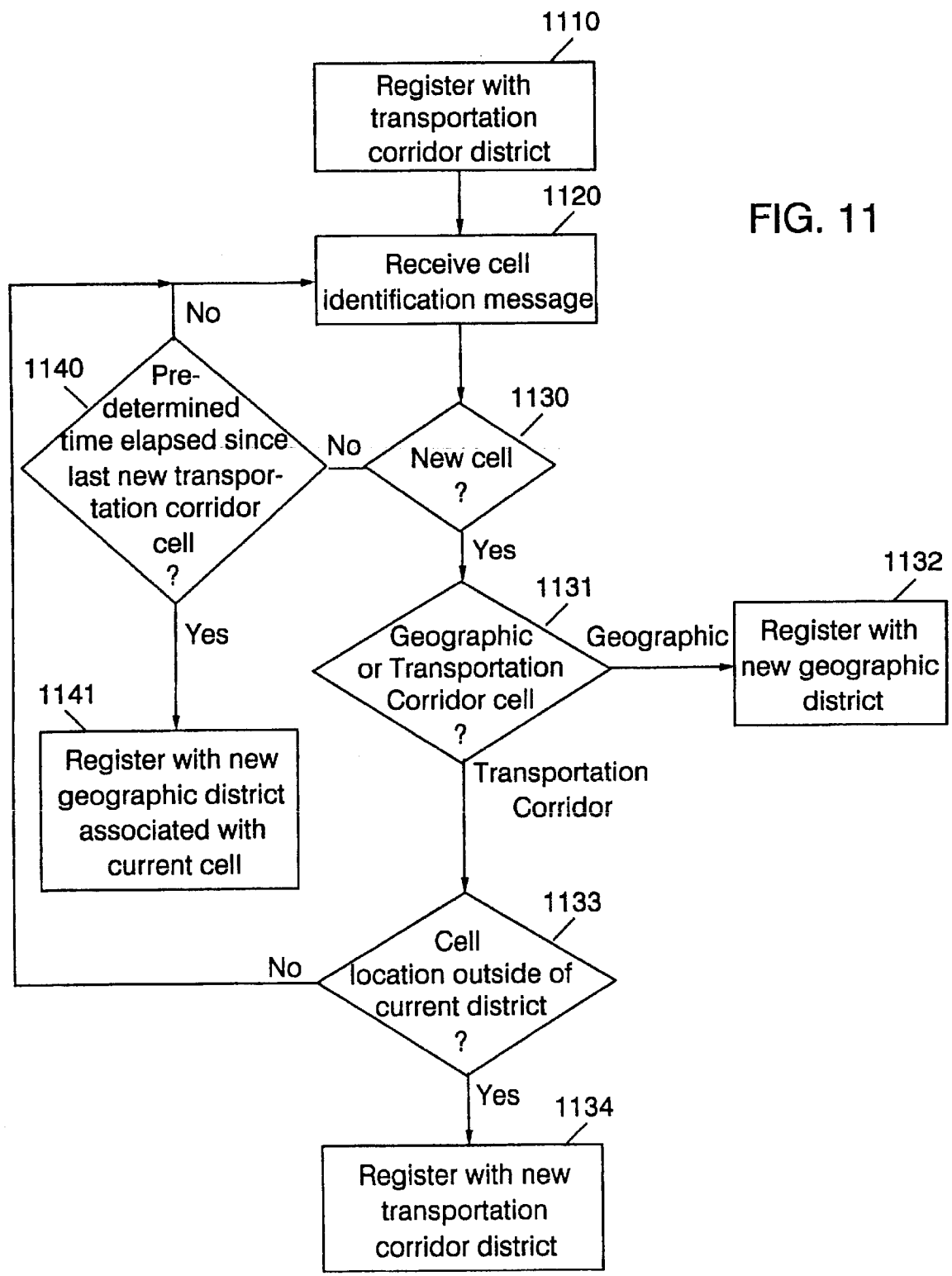

FIGS. 9–11 are flowchart illustrations of methods and apparatus (systems) used for tracking subscriber units in a cellular communications system according to the present invention. It will be understood that each block of the flowchart illustrations, and combinations of blocks in the flowchart illustrations, may be implemented in components of a cellular communications system such as PDIS's, base stations and subscriber units. Those skilled in the art will also appreciate that portions of these operations may be executed as computer program instructions loaded in a computer or other data processing apparatus included in the cellular communications system, thus producing a machine which provides means for implementing the functions specified in the flowchart block or blocks. The computer program instructions may cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustrations support combinations of means for performing the specified functions and combinations of steps for performing the specified functions.

Those skilled in the art will appreciate that the apparatus supported by the blocks of the flowchart illustrations and combinations of blocks in the flowchart illustrations can be implemented by special purpose hardware-based computer systems which perform the specified functions or steps, or combinations of hardware and computer instructions. The apparatus for a communications system may include various well-known communications system components, including cellular base stations, mobile telephone switching offices, pACT network components, CDPD network components, and the like. The operation of these components is well-known to those skilled in the art, and need not be discussed in greater detail herein. Operations described in the flowchart illustrations may be performed within particular system components, e.g., association of a particular subscriber unit with a district may be performed in a PDIS of a pACT network, or may distributed across multiple components.

Operations 900 for tracking a subscriber unit in a cellular communications system according to the present invention are illustrated in FIG. 9. At least one district is defined for each cell of the communications system (Block 910). A cell identification message is broadcast in each cell, identifying the cell location, the cell type and the geographic extent of each district associated with the cell (Block 920), for example, by transmitting a cell identification message including the fields indicated in Table 1. A subscriber unit receives at least one of the cell identification messages (Block 930), and is registered with one of the districts based on the cell type, cell location and district geographical extent identified in the received at least one cell identification message (Block 940).

Exemplary operations for registering a subscriber unit with a new geographic or transportation district from a current geographic district are illustrated in FIG. 10. After a subscriber unit is registered with the geographic district (Block 1010), the subscriber unit receives a cell identification message (Block 1020). If the message does not identify a new cell (Block 1030), indicating a transition across a cell boundary, the subscriber unit remains registered with the same geographic district. If the message identifies a new cell (Block 1030), the subscriber unit next determines whether the new cell is a transportation corridor or geographic cell (Block 1040). If the new cell is a geographic cell, the subscriber determines if the new cell's location is outside of the current geographic district (Block 1041). If the new cell is outside of the current geographic district, the subscriber unit registers with the geographic district associated with the new cell (Block 1042). If the new cell's location is inside the current geographic district, the subscriber unit remains registered with that district.

If the new cell is a transportation corridor district, the subscriber unit determines if a predetermined number of successive new transportation corridor district cells districts have been encountered within a predetermined time (Block 1050). If not, the subscriber determines if the new transportation corridor cell's location is within the current geographic district (Block 1051). If the new cell is within the current district, the subscriber unit remains registered with the current district. If the new cell is outside of the current district, the subscriber unit registers with the geographic district with which the new transportation corridor cell is associated (Block 1042). If more than the predetermined number of new transportation corridor cells have been encountered within the predetermined time, thus indicating that the subscriber is moving along a highway or similar transportation corridor, the subscriber unit registers with the transportation district associated with the new cell (Block 1060).

Exemplary operations for registering a subscriber unit with a new geographic or transportation corridor district as the subscriber unit exits a current transportation corridor district are illustrated in FIG. 11. After the subscriber unit is registered with the transportation corridor district (Block 1110), the subscriber unit receives a cell identification message (Block 1120). If the cell identification message identifies a new cell (Block 1130), the subscriber unit next determines if the new cell is a transportation corridor or a geographic cell (Block 1131). If the new cell is a geographic cell, the subscriber unit registers with the geographic district associated with the new cell (Block 1132). If the new cell is a transportation corridor cell, the subscriber unit determines if the new cell is within the current transportation corridor district (Block 1133). If the new transportation corridor cell's location is outside of the current transportation corridor district, the subscriber unit registers with the transportation corridor district associated with the new transportation corridor cell (Block 1134). If not, the subscriber remains registered with the current transportation corridor district. If the received cell identification message fails to identify a new cell, the subscriber unit determines whether a predetermined time has elapsed since encountering a new transportation corridor cell (Block 1140). If the predetermined time has not elapsed, indicating that the subscriber is likely to be still traveling on the highway or other transportation corridor at a relatively high speed, the subscriber unit remains registered with the current transportation district. If the predetermined time has elapsed, indicating the subscriber unit has slowed, exited the transportation corridor, or otherwise reduced its mobility, the subscriber unit registers with the geographic district associated with the current cell (Block 1141).

An Exemplary Scenario

Figure 12:
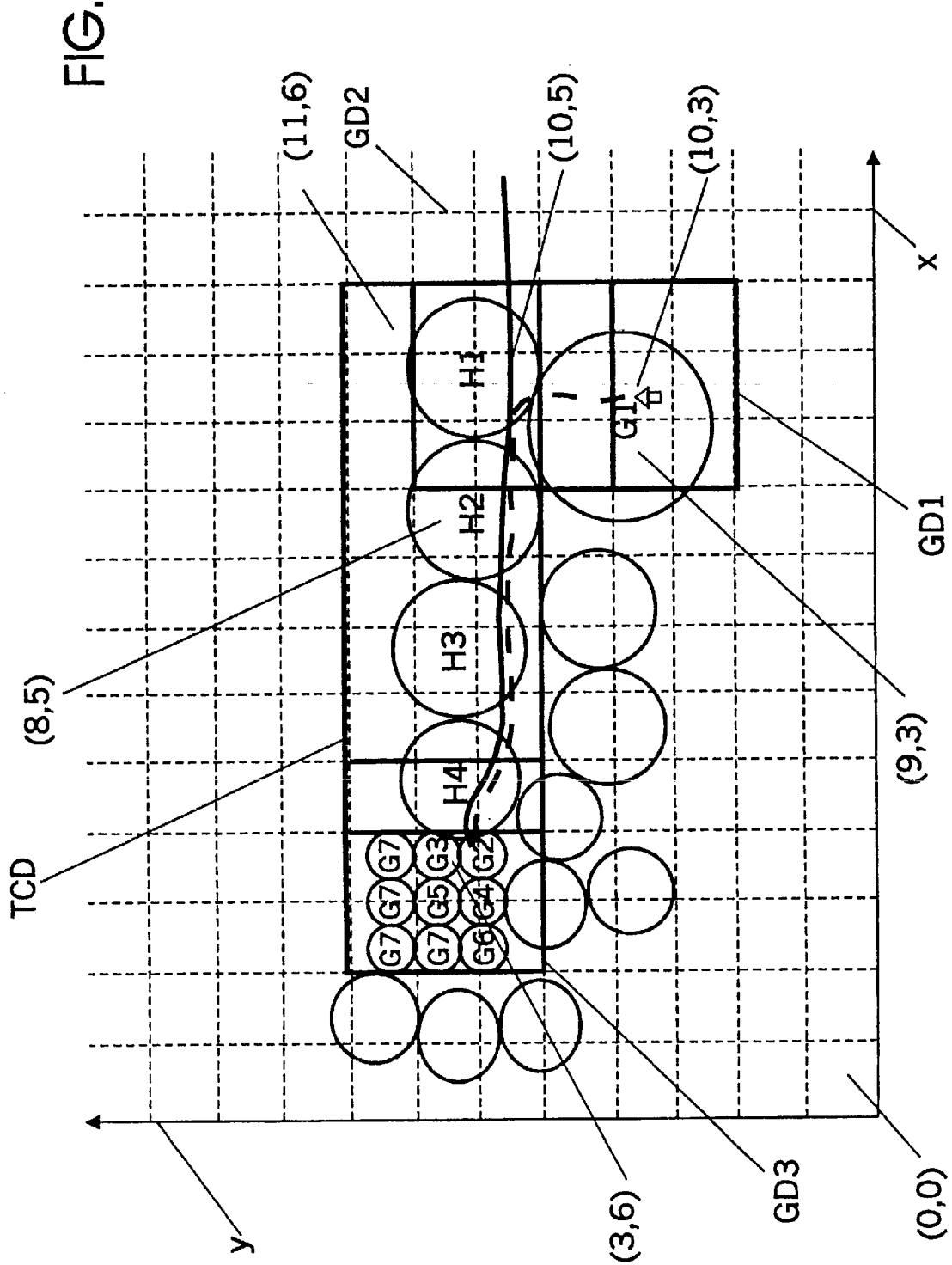
FIG. 12 is a plan view illustrating an exemplary scenario for registration of a subscriber unit according to the present invention.

An example of tracking a subscriber unit according to the present invention is provided in FIG. 12, which illustrates a trajectory followed by a subscriber unit 220 traveling from home in a sparsely populated suburb, along a highway 400, and into an urban center. Assume the user of the subscriber unit resides at location (10,3). Assume the region in which the user resides is not very dense and the cell G1 covering the neighborhood (10,3) is relatively large when compared to the cells covering the urban core. Assume that the cell location for the home cell G1 is (10,3) and the geographic offsets for the geographic district GD1 associated with the cell G1 are ngx=1, pgx=1, ngy=1 and pgy=1, and thus, that the cell G1 is the only cell in the geographic district.

When the user takes the subscriber unit out of the home cell G1 to join the traffic flow on the highway 400, a transportation corridor cell H1 is entered. Assuming that the cell location of the transportation corridor cell H1 is (10,5), outside the user's home geographic district GD1, the subscriber registers with the geographic district GD2 associated with the transportation corridor cell H1. Assume that the geographic offsets of this new geographic district GD2 are ngx=1, pgx=1, ngy=1, pgy=1. After joining the highway 400 and traversing two highway cells H1, H2 within a predetermined time, the subscriber registers with the transportation corridor district TCD associated with the transportation corridor cells H1, H2 for the drive to the urban center. Assume that the cell location for the second transportation corridor cell H2 is (8,5) and the offsets for the transportation corridor district TCD are nhx=4, phx=3, nhy=1 and phy=1. The transportation corridor district defined by these values encompasses the transportation corridor cells H1–H4 covering the highway 400 to the downtown core. Registration with the transportation corridor district allows the subscriber unit to travel on the highway 400 to the vicinity of the urban center without having to register as new cells are encountered. When the subscriber unit nears the urban core, it enters a geographic cell G2 at cell location (3,6) which is outside the transportation corridor district, leading the subscriber unit to register with the geographic district GD3 associated with the geographic cell G3 Assuming that the geographic offsets for this new geographic district GD3 to be ngx=1, pgx=1, ngyp32 1 and pgy=1, the subscriber unit may traverse the nine cells GD2–GD10 of the urban center without having to re-register. In sum, only three cell registrations are required for the trip from home to the urban core and, assuming the user stays in the urban core for the duration of the day, no further registrations may be required until the person enters the transportation corridor district TCD again to return home.

Subscriber Units

Figure 13:
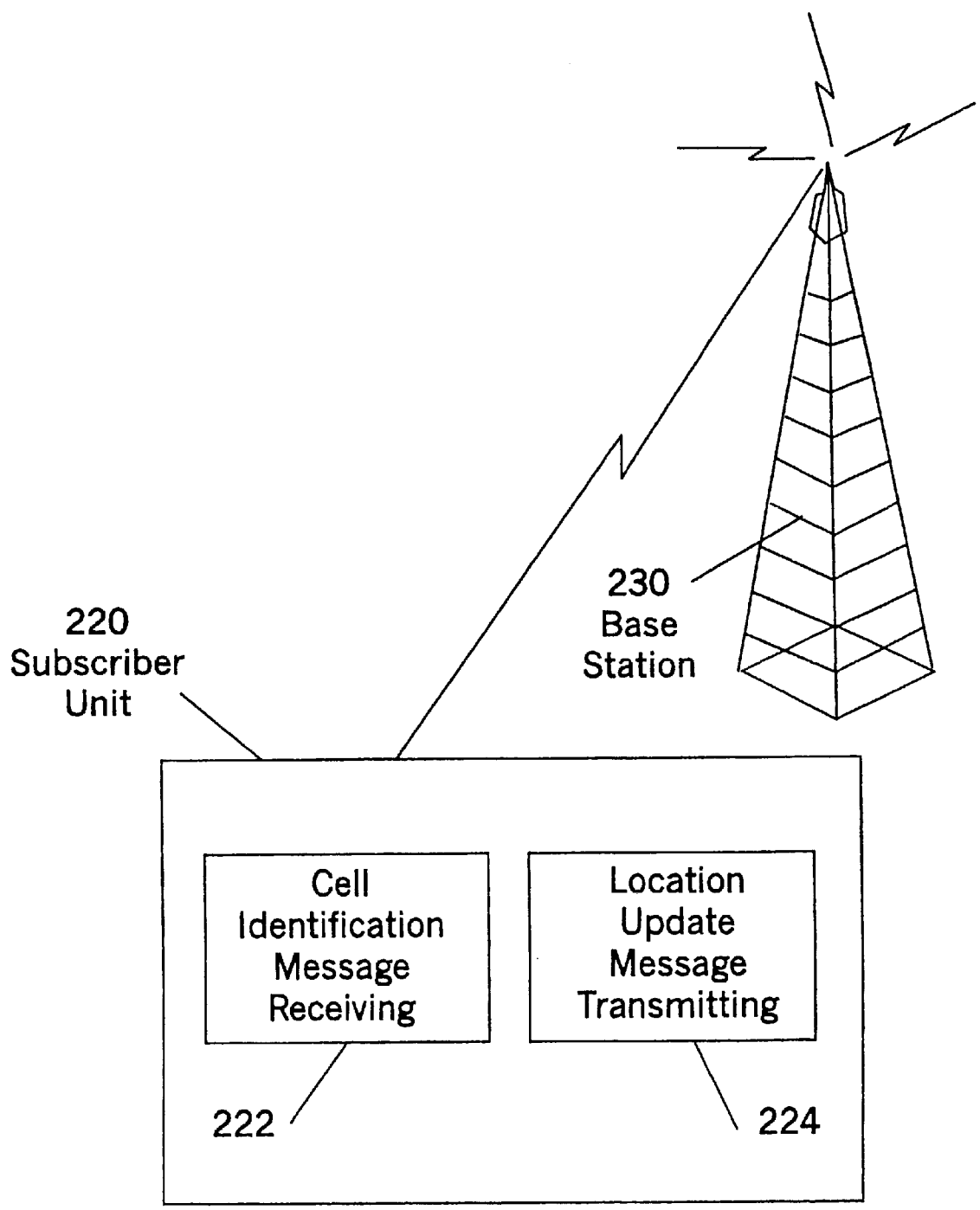
FIG. 13 is a schematic diagram of a subscriber unit according to the present invention.

As illustrated in FIG. 13, an embodiment of a subscriber unit 220 for use in a cellular communications system in which the cells are associated with registration districts as described above includes cell identification message receiving means 222 for receiving cell identification messages, e.g., messages having the format given in Table 1, broadcast in the cells of the communications system, for example, from a base station 230. The subscriber unit 220 also includes location update message transmitting means 224 for transmitting a location update message, e.g., a message having the format given in Table 2, to in response to a received cell identification message to register the subscriber unit 220 with a registration district.

If the subscriber unit is registered with a geographic district, as described above, the location update message transmitting means 224 preferably transmits a location update message which registers the subscriber unit 220 with a second geographic district upon receipt of a cell identification message identifying a geographic cell associated with the new district having a location outside of the current geographic district. The location update message transmitting means 224 preferably transmits a location update message which registers the subscriber unit with a new transportation corridor district in response to receipt of cell identification messages identifying a predetermined number of transportation corridor cells within a predetermined time interval.

If the subscriber unit is registered with a transportation corridor district, the location update message transmitting means 224 preferably transmits a location update message which registers the subscriber unit 220 with a new geographic district in response to receipt of a cell identification message identifying a geographic cell associated with the new geographic district. The location update message transmitting means 224 preferably transmits a location update message which registers the subscriber unit 220 with a new transportation corridor district in receipt of a cell identification message identifying a new transportation corridor cell associated with the new transportation corridor district. The location update message transmitting means 224 preferably transmits a location update message which registers the subscriber unit 220 with a geographic district associated with the current transportation corridor cell if a predetermined time interval passes without encountering a new transportation corridor district.

Those skilled in the art will appreciate that the cell identification message receiving means 222 and the location update message transmitting means 224 may include various communications system components commonly found in communications terminals such as cellular radiotelephones, CDPD, pACT and other personal communications systems (PCS) terminals, and the like. The cell identification message receiving means 222 may include such components as antennas, receivers, demodulators, decoders, signal processors, amplifiers and the like, while the location update message transmitting means 224 may include such components as encoders, modulators, multiplexers, transmitters, antennas, and the like. The design and operation of these components is well-known to those skilled in the art and need not be discussed in detail herein. The means 222, 224 may be implemented using special purpose hardware, software running on general purpose or special purpose data processors, or combinations thereof.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of tracking subscriber units in a cellular communications system including a plurality of cells, each cell having a cell location, the method comprising the steps of:

defining at least one district for each cell, each district having a geographical extent with respect to the cell location of the cell, to thereby associate each cell with at least one district;

broadcasting a respective cell identification message in a respective one of the plurality of cells, the cell identification message for a cell identifying the cell location of the cell, the geographical extent, with respect to the cell location, of the least one district to which the cell is assigned and a cell type representing a mobility characteristic of a subscriber unit population typically located in the cell;

receiving a cell identification message at a subscriber unit; and registering the subscriber unit with one of the districts according to the cell type, the cell location and the district geographical extent identified in the received cell identification message.

2. A method according to claim 1:
wherein said step of receiving comprises the step of receiving a first cell identification message identifying a first cell having a first cell location and associated with a first district;
wherein said step of registering comprises the step of registering the subscriber unit with the first district in response to receipt of the first cell identification message;
wherein said step of receiving further comprises the step of receiving a second cell identification message identifying a second cell having a cell location outside of the geographical extent of the first district while the subscriber unit is registered with the first district; and
wherein said step of registering further comprises the step of registering a subscriber unit with the second district in response to receipt of the second cell identification message.

3. A method according to claim 1:
wherein said step of receiving a cell identification message comprises the step of receiving a first cell identification message identifying a first cell having a first cell location and associated with a first district;
wherein said step of registering comprises the step of registering the subscriber unit with the first district in response to receipt of the first cell identification message;
wherein said step of receiving a cell identification message further comprises the step of receiving a second cell identification message identifying a second cell having a cell location within the first geographical extent of the first district while the subscriber unit is registered with the first district; and
wherein said step of registering further comprises the step of continuing registration with the first district in response to receipt of the second cell identification message.

4. A method according to claim 1, wherein the plurality of cells comprises cells of a first cell type characterized as typically having a subscriber unit population located therein dominated by subscriber units of a first aggregate mobility and cells of a second cell type characterized as typically having a subscriber unit population located therein including a subpopulation of subscriber units of a second aggregate mobility higher than the first aggregate mobility, and;
wherein said step of defining a district for each cell comprises the step of defining districts of a first district type for cells of the first and second cell types, and defining districts of a second district type for cells of the second cell type, such that districts of the first type encompass cell locations of at least one of a cell of the first cell type and a cell of the second cell types while districts of the second type encompass cell locations of cells of the second cell type; and
wherein said step of registering comprises the step of registering the subscriber unit with one of a district of the first district type and a district of the second type according to the cell type identified in the received cell identification message.

5. A method according to claim 4:
wherein said step of receiving comprises the step of receiving a first cell identification message identifying a first cell having a cell location having a first district of the first district type associated therewith;
wherein said step of registering comprises the step of registering the subscriber unit with the first district in response to receipt of the first cell identification message;
wherein said step of receiving further comprises the step of receiving a cell identification message while the subscriber unit is registered with the first district; and
wherein said step of registering further comprises one of the steps of:
registering with a new district of the second district type in response to receipt, within a predetermined time interval, of a predetermined number of cell identification messages identifying cells of the second type having the new district associated therewith;
registering with a new district of the first district type in response to receipt of a cell identification message identifying a cell having a cell location outside of the geographical extent of the first district and having the new district associated therewith; and
continuing registration with the first district in response to receipt of a cell identification message identifying a cell having a cell location within the geographical extent of the first district.

6. A method according to claim 4:
wherein said step of receiving comprises the step of receiving a first cell identification message identifying a first cell having a first district of the second district type associated therewith;
wherein said step of registering comprises the step of registering with the first district in response to receipt of the first cell identification message;
wherein said step of receiving further comprises the step of receiving a cell identification message while the subscriber unit is registered with the first district; and
wherein said step of registering further comprises one of the following steps:
registering with a new district of the first district type in response to receipt of a cell identification message identifying a cell of the first cell type having a cell location outside of the geographical extent of the first district;
registering with a new district of the second district type in response to receipt of a cell identification message identifying a cell of the second cell type having a cell location outside of the geographical extent of the first district;
registering with the second district of the first type in response to failing to receive, within a predetermined time interval, a cell identification message identifying a new cell of the second cell type having a cell location within the geographical extent of the first district of the second type; and
continuing registration with the first district of the second type in response to receipt, within the predetermined time interval, of a cell identification message identifying a new cell of the second type having a cell location within the geographical extent of the first district of the second type.

7. A method according to claim 4, wherein said step of defining comprises the step of defining a district of the first district type for cells of the first and second cell types.

8. A method according to claim 4, wherein said step of defining comprises the step of defining districts of the second type only for cells of the second cell type.

9. A method according to claim 4, wherein said step of defining comprises the step of defining a district of the first type to a cell such that the district has a geographic extent which encompasses cell locations of cells which surround the cell.

10. A method according to claim 4 wherein said step of defining comprises the step of defining a district of the first district type for cells of the second cell type such that the geographic extent of the district substantially coincides with a transportation corridor.

11. A method according to claim 1, wherein said step of registering comprises the steps of:

communicating a location update message from the subscriber unit to a base station serving a cell identified in the received cell identification message, the location update message identifying the subscriber unit and the district type with which the subscriber unit is to be registered; and associating the subscriber unit with a district identified in the cell identification message having the district type identified in the location update message to thereby register the subscriber unit with the district.

12. A method according to claim 1:

wherein said step of defining districts is preceded by the steps of:

defining a geographic region served by the cellular communications system in terms of a coordinate reference frame; and defining the cell location of each cell in terms of the coordinate reference frame; and wherein said step of defining at least one district comprises the step of defining at least one district for each cell, the district having a geographic extent represented in terms of a plurality of offsets with respect from the cell location in terms of the coordinate reference frame.

13. A method according to claim 12, wherein said step of defining a geographic region in terms of a coordinate reference frame comprises the step of defining the geographic area in terms of a coordinate reference frame which deviates from rectangularity according to a predetermined warping.

14. A method according to claim 1, wherein said step of registering is followed by the step of:

broadcasting a paging message in cells having locations within the district with which the subscriber is registered.

15. A method according to claim 14, wherein said step of broadcasting a paging message is followed by the steps of:

receiving the paging message at the subscriber unit;

acknowledging the paging message to a base station serving one cell associated with the district with which the subscriber unit is registered, from the subscriber unit; and routing a message addressed to the subscriber unit through a base station serving the one cell.

16. A cellular communications system, the system comprising:

a subscriber unit;

a plurality of cells, each cell having a cell location;

district defining means for defining at least one district for each cell, each district having a geographical extent with respect to the cell location of the cell, to thereby associate each cell with at least one district;

cell identification message broadcasting means, responsive to said district defining means, for broadcasting a respective cell identification message in a respective one of said plurality of cells, the cell identification message for a cell identifying the cell location of the cell, the geographical extent, with respect to the cell location, of the least one district to which the cell is assigned and a cell type representing a mobility characteristic of a subscriber unit population typically located in the cell;

cell identification message receiving means, located at the subscriber unit, for receiving a cell identification message; and subscriber unit registering means, responsive to the cell identification receiving means, for registering the subscriber unit with one of the districts according to the cell type, the cell location and the district geographical extent identified in the received cell identification message.

17. A system according to claim 16 wherein said subscriber unit registering means comprises:

means for registering the subscriber unit with a first district in response to receipt of a first cell identification message identifying a first cell having a first cell location and associated with a first district and for registering the subscriber unit with a second district in response to receipt, while the subscriber unit is registered with the first district, of a second cell identification message identifying a second cell having a cell location outside of the geographical extent of the first district.

18. A system according to claim 16 wherein said subscriber unit registering means further comprises:

means for registering the subscriber unit with a first district in response to receipt of a first cell identification message identifying a first cell having a first cell location and associated with a first district and for continuing registration of the subscriber unit with the first district in response to receipt, while the subscriber unit is registered with the first district, of a second cell identification message identifying a second cell having a cell location within the geographical extent of the first district.

19. A system according to claim 16:

wherein said plurality of cells comprises cells of a first cell type characterized as typically having a subscriber unit population located therein dominated by subscriber units of a first aggregate mobility and cells of a second cell type characterized as typically having a subscriber unit population located therein including a subpopulation of subscriber units of a second aggregate mobility higher than the first mobility;

wherein said district defining means comprises means for defining districts of a first district type for cells of the first and second cell types and for defining a districts of a second district type only for cells of the second cell type, such that districts of the first type encompass cell locations of at least one of a cell of the first cell type and a cell of the second cell types while districts of the second type encompass cell locations of cells of the second cell type; and wherein said subscriber unit registering means comprises means for registering the subscriber unit with one of a district of the first district type and a district of the second district type according to the cell type identified in the received cell identification message.

20. A system according to claim 19 wherein said subscriber unit registering means comprises:

means for registering the subscriber unit with a first district of the first district type in response to receipt of a first cell identification message identifying a first cell having a cell location and the first district associated therewith;

means for registering with a new district of the second district type in response to receipt, while the subscriber unit is registered with the first district, of a predetermined number of cell identification messages identifying cells of the second type having the new district associated therewith, within a predetermined time interval;

means for registering with a new district of the first district type in response to receipt, while the subscriber unit is registered with the first district, of a cell identification message identifying a cell having a cell location outside of the geographical extent of the first district of the first type and having the new district associated therewith; and means for continuing registration with the first district in response to receipt, while the subscriber is registered with the first district, of a cell identification message identifying a cell having a cell location within the geographical extent of the first district.

21. A system according to claim 20:

wherein said subscriber unit registering means comprises means for registering the subscriber unit with a first district of the second district type, in response to receipt of a first cell identification message identifying a first cell having the first district associated therewith;

means for registering with a new district of the first district type in response to receipt, while the subscriber unit is registered with the first district, of a cell identification message identifying a cell of the first cell type having a cell location outside of the geographical extent of the first district;

means for registering with a new district of the second district type in response to receipt, while the subscriber unit is registered with the first district, of a cell identification message identifying a cell of the second cell type having a cell location outside of the geographical extent of the first district;

means for registering with a new district of the first type in response to failure to receive, during a predetermined time interval while the subscriber unit is registered with the first district, a cell identification message identifying a new cell of the second cell type having a cell location within the geographical extent of the first district; and means for continuing registration with the first district in response to receipt, within the predetermined time interval, of a cell identification message identifying a second cell of the second type having a cell location within the geographical extent of the first district.

22. A system according to claim 19, wherein said district defining means comprises means for defining said districts of the first district type for cells of the first and second cell types.

23. A system according to claim 19, wherein said district defining means comprises means for defining said districts of second type only for cells of the second cell type.

24. A system according to claim 19, wherein said district defining means comprises means for defining said districts of the first district type for each respective cell such that the district associated with a respective cell has a geographic extent which encompasses cell locations of cells which surround the cell.

25. A system according to claim 19 wherein said step of defining comprises the step of defining a district of the first district type for cells of the second cell type such that the geographic extent of the district substantially coincides with a transportation corridor.

26. A system according to claim 19:

paging message receiving means, responsive to said paging message broadcasting means, for receiving the paging message at the subscriber unit;

paging message acknowledgment means, responsive to said paging message receiving means, for acknowledging the paging message to a base station serving one cell associated with the district with which the subscriber unit is registered, from the subscriber unit; and means, responsive to said paging message acknowledgment means, for routing a message addressed to the subscriber unit through a base station serving the one cell.

27. A system according to claim 16, wherein subscriber unit registering means comprises:

location update message communicating means for communicating a location update message from the subscriber unit to a base station serving a cell identified in the received cell identification message, the location update message identifying the subscriber unit and the district type with which the subscriber unit is to be registered; and means, responsive to said location update message communicating means, for associating the subscriber unit with a district identified in the cell identification message having the district type identified in the location update message to thereby register the subscriber unit with the district.

28. A system according to claim 16, further comprising:

means for defining a geographic region served by the cellular communications system in terms of a coordinate reference frame; and means for defining the cell location of each cell in terms of the coordinate reference frame; and wherein said district defining means comprises means for defining at least one district for each cell, the district having a geographic extent represented in terms of a plurality of offsets with respect from the cell location in terms of the coordinate reference frame.

29. A system according to claim 28, wherein said means for defining a geographic region in terms of a coordinate reference frame comprises means for defining the geographic area in terms of a coordinate reference frame which deviates from rectangularity according to a predetermined warping.

30. A system according to claim 16, further comprising:

paging message broadcasting means for broadcasting a paging message for the subscriber unit in cells having locations within the district with which the subscriber is registered.

31. A subscriber unit for communicating with a cellular communications system including a plurality of cells, each cell having a cell location and associated with at least one district, the cellular communications system broadcasting a respective cell identification message in a respective one of the plurality of cells, the cell identification message for a cell identifying the cell location of the cell, the geographical extent, with respect to the cell location, of at least one district with which the cell is associated and a cell type representing a mobility characteristic of a subscriber unit population typically located in the cell, the subscriber unit comprising:

cell identification message receiving means for receiving a cell identification message; and location update message transmitting means, responsive to said cell identification message receiving means, for transmitting a location update message identifying the subscriber unit and a district type with which the subscriber unit is to be identified according to the cell type, the cell location and the district geographical extent identified in the received cell identification message, to thereby register the subscriber unit with the district identified in the location update message.

32. A system according to claim 31 wherein said location update message transmitting means comprises:

means for transmitting a first location update message which registers the subscriber unit with a first district in response to receipt of a first cell identification message identifying a first cell having a first cell location and associated with the first district; and means for transmitting a second location update message which registers the subscriber unit with a second district in response to receipt, while the subscriber unit is registered with the first district, of a second cell identification message identifying a second cell associated with the second district and having a cell location outside of the geographical extent of the first district.

33. A subscriber unit according to claim 31, wherein the plurality of cells includes cells of a first cell type characterized as typically having a subscriber unit population located therein dominated by subscriber units of a first aggregate mobility and cells of a second cell type characterized as typically having a subscriber unit population located therein including a subpopulation of subscriber units of the first aggregate mobility and a subpopulation of subscriber units of a second aggregate mobility higher than the first mobility, wherein the cellular communications system includes districts of a first district type associated with cells of the first and second cell types and districts of a second district type associated only with cells of the second cell type, such that districts of the first type encompass cell locations of at least one of a cell of the first cell type and a cell of the second cell types while districts of the second type encompass cell locations of cells of the second cell type, and wherein said location update transmitting means comprises:

means for transmitting a location update message identifying one of the first and second district types according to the cell type identified in the received cell identification message.

34. A subscriber unit according to claim 33 wherein said location update message transmitting means comprises:

means for transmitting a location update message which registers the subscriber unit with a first district of the first district type in response to receipt of a first cell identification message identifying a first cell having a cell location and the first district associated therewith;

means for transmitting a location update message which registers the subscriber unit with a new district of the second district type in response to receipt, while the subscriber unit is registered with the first district, of a predetermined number of cell identification messages identifying cells of the second type having the new district associated therewith, within a predetermined time interval;

means for transmitting a location update message which registers the subscriber unit with a new district of the first district type in response to receipt, while the subscriber unit is registered with the first district, of a cell identification message identifying a cell having a cell location outside of the geographical extent of the first district of the first type and having the new district associated therewith; and means for transmitting a location update message which registers the subscriber unit with the first district in response to receipt, while the subscriber is registered with the first district, of a cell identification message identifying a cell having a cell location within the geographical extent of the first district.

35. A subscriber unit according to claim 33, wherein said location update message transmitting means comprises:

means for transmitting a location update message which registers the subscriber unit with a first district of the second district type, in response to receipt of a first cell identification message identifying a first cell having the first district associated therewith;

means for transmitting a location update message which registers the subscriber unit with a new district of the first district type in response to receipt, while the subscriber unit is registered with the first district, of a cell identification message identifying a cell of the first cell type having a cell location outside of the geographical extent of the first district;

means for transmitting a location update message which registers the subscriber unit with a new district of the second district type in response to receipt, while the subscriber unit is registered with the first district, of a cell identification message identifying a cell of the second cell type having a cell location outside of the geographical extent of the first district;

means for transmitting a location update message which registers the subscriber unit with a new district of the first type in response to failure to receive, during a predetermined time interval while the subscriber unit is registered with the first district, a cell identification message identifying a new cell of the second cell type having a cell location within the geographical extent of the first district; and means for transmitting a location update message which registers the subscriber unit with the first district in response to receipt, within the predetermined time interval, of a cell identification message identifying a second cell of the second type having a cell location within the geographical extent of the first district.

* * * * *